United States Patent
Teng et al.

(10) Patent No.: US 6,991,242 B2
(45) Date of Patent: Jan. 31, 2006

(54) ROLLER SCOOTER WITH TWO PIVOTABLE PEDALS

(76) Inventors: Chia-Chi Teng, No.36-3, Jioushe Village, Yuanli Township, Miaoli County 358 (TW); Chien-Hung Chen, No.86, Jingguo Rd., Dajia Township, Taichung County 437 (TW)

( * ) Notice: Subject to any disclaimer, the term of this patent is extended or adjusted under 35 U.S.C. 154(b) by 45 days.

(21) Appl. No.: 10/761,093

(22) Filed: Jan. 20, 2004

(65) Prior Publication Data

US 2005/0156396 A1    Jul. 21, 2005

(51) Int. Cl.
*B62M 1/00*    (2006.01)

(52) U.S. Cl. .................................. 280/87.041
(58) Field of Classification Search ...............
280/87.041–87.043, 87.03, 87.05, 263, 264; 180/180, 181
See application file for complete search history.

(56) References Cited

U.S. PATENT DOCUMENTS

| | | | |
|---|---|---|---|
| 6,739,606 B2 * | 5/2004 | Rappaport | 280/87.041 |
| 6,840,524 B2 * | 1/2005 | Yu | 280/87.041 |
| 2002/0063406 A1 * | 5/2002 | Feng | 280/87.041 |
| 2003/0090076 A1 * | 5/2003 | Beleski | 280/87.041 |
| 2004/0032105 A1 * | 2/2004 | Tsai | 280/87.041 |
| 2004/0075230 A1 * | 4/2004 | Lin | 280/87.041 |
| 2005/0001399 A1 * | 1/2005 | Yeo et al. | 280/87.041 |
| 2005/0082778 A1 * | 4/2005 | Chuang | 280/87.041 |

* cited by examiner

*Primary Examiner*—Bryan Fischmann
(74) *Attorney, Agent, or Firm*—Alan D. Kamrath; Nikolai & Mersereau, P.A.

(57) ABSTRACT

A scooter includes two pedal assemblies pivotably connected to a head tube through which a steering rod extends. A handlebar and a front wheel are, respectively, connected to two ends of the steering rod. Each of the two pedal assemblies has a rear wheel assembly which is pivotably connected to an end of the pedal assembly. A spring has one end fixed to the pedal assembly and the other end of the spring is connected to the rear wheel assembly. The user operates the two pedal assemblies outward and inward in sequence to move the scooter forward. The two rear wheel assemblies are pivoted when the pedal assemblies are operated.

6 Claims, 6 Drawing Sheets

ROLLER SCOOTER WITH TWO PIVOTABLE PEDALS

FIELD OF THE INVENTION

The present invention relates to a roller scooter that includes two pedals pivotably connected to an extension connected to a head tube, and the two pedals are pivoted outward or inward simultaneously to move the scooter.

BACKGROUND OF THE INVENTION

A conventional roller scooter generally includes a fixed deck which has one end thereof connected to an extension connected to a head tube through which a steering rod extends. A handle is connected to a top of the steering rod, and a front wheel is connected to a lower end of the steering rod. A rear wheel is connected to the other end of the deck. The user stands on the deck with one foot, and the other foot kicks the ground to push the scooter forward. The conventional scooter exercises only one foot which kicks the ground and falls easily aside, because there are only two wheels. Furthermore, the upper body of the user does not move during the operation of the conventional scooter. Thus, the user does not have too much fun in operating the conventional scooter.

The present invention intends to provide a roller scooter that both feet are exercised and includes two pedal assemblies which need to be pivoted outward and inward in sequence to move the scooter.

SUMMARY OF THE INVENTION

The present invention relates to a scooter which comprises a head tube through which a steering rod extends. A handlebar and a front wheel are, respectively, connected to a top and a lower end of the steering rod. An extension extends from the head tube, and two pedal assemblies are pivotably connected to the extension. A rear wheel assembly includes a rear wheel and is pivotably connected to each one of the two pedal assemblies. A spring is connected between each one of the two rear wheel assemblies and each one of the two pedal assemblies.

The main object of the present invention is to provide a scooter that is operated by pivoting two pedals simultaneously so that the lower part of the body is exercised and the upper part of the body needs to swing to keep balance to the lower body.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
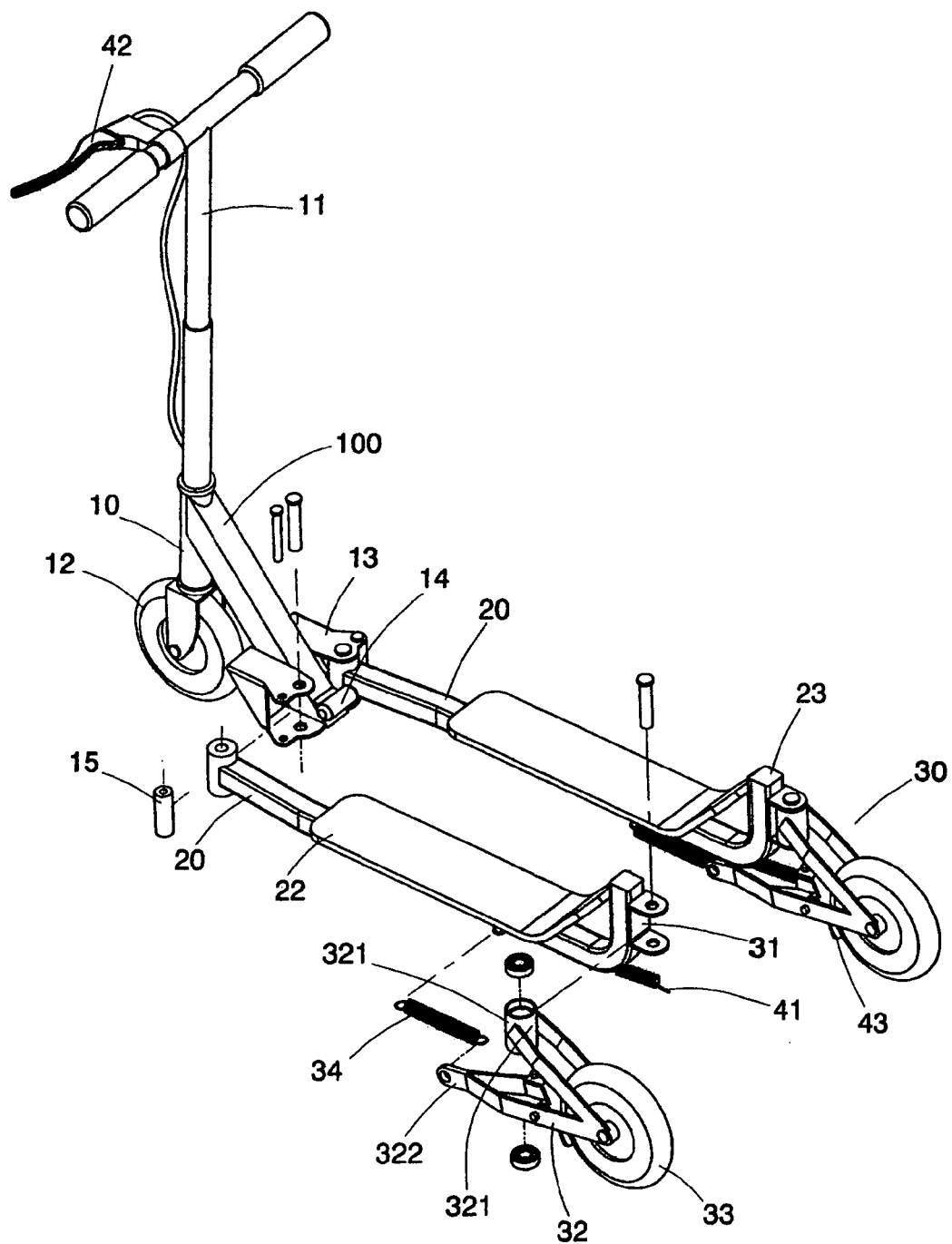
FIG. 1 is an exploded view to show the scooter of the present invention.
Figure 2:
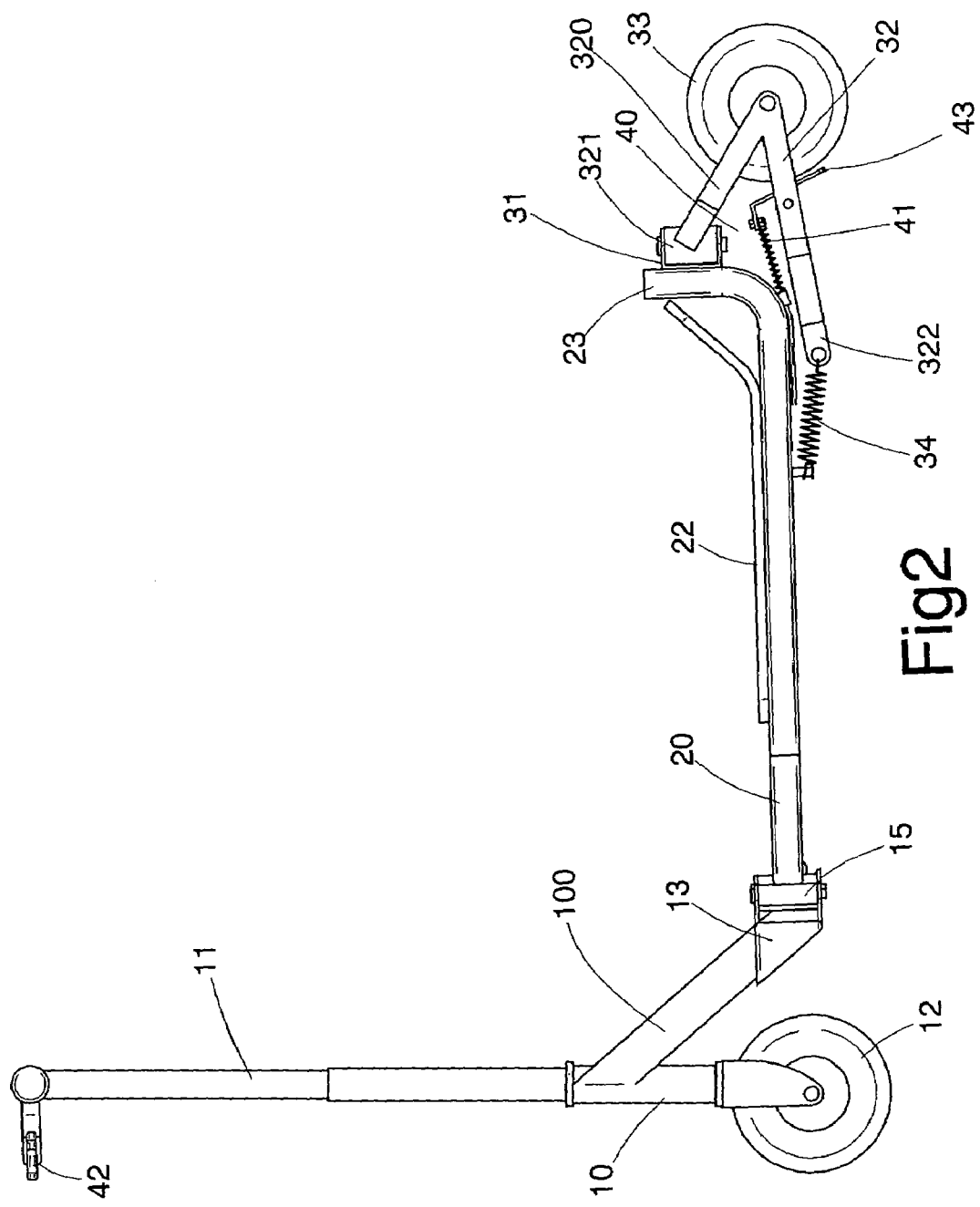
FIG. 2 is a side view to show the scooter of the present invention.
Figure 3:
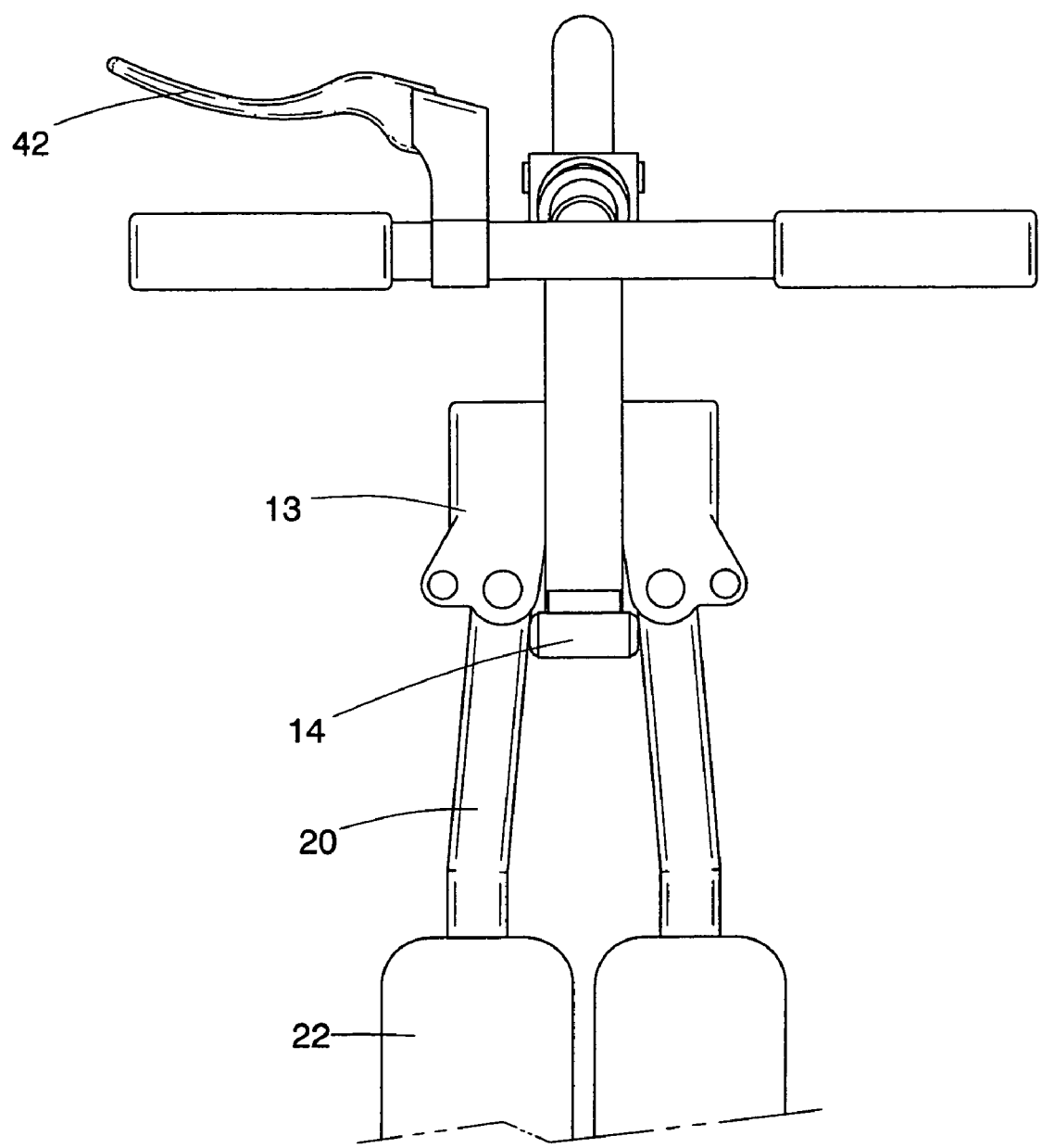
FIG. 3 shows a top view of the connection of the two pedal assemblies and the extension of the scooter of the present invention.

Referring to FIGS. 1 to 3, the scooter of the present invention comprises a head tube 10, and a steering rod 11 rotatably extends through the head tube 10. A handlebar is connected to a top of the steering rod 11, and a front wheel 12 is pivotably connected to a lower end of the steering rod 11. An extension 100 extends from the head tube 10, and two side parts 13 are connected to two sides of the extension 100. Each side part 13 has an opening in which a first end of each of the two pedal assemblies 20 is pivotably connected. Each of the pedal assemblies 20 has a pedal 22 connected thereto, and a rear wheel assembly 30 is connected to a second end of each of the pedal assemblies 20.

Figure 4:
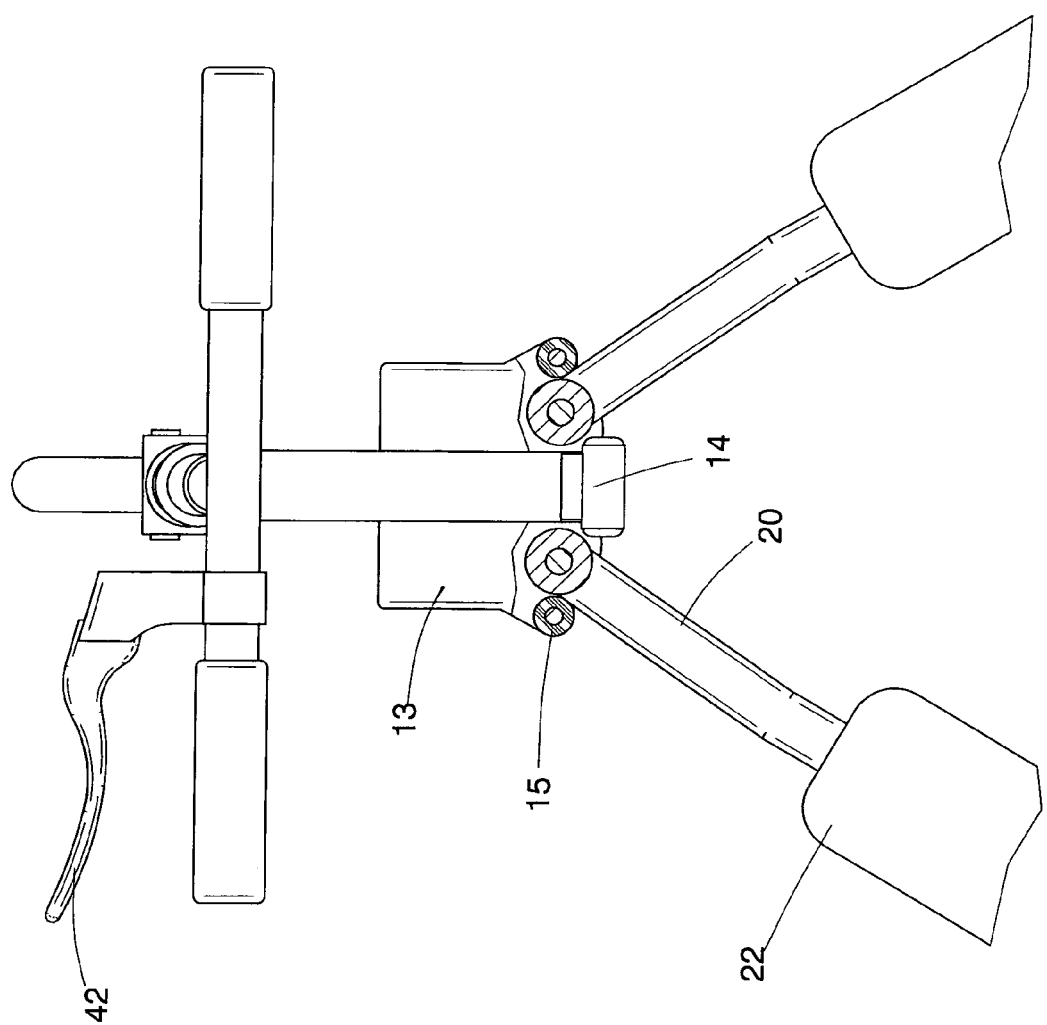
FIG. 4 shows two limitation members limiting the angle of the swinging of the two pedal assemblies.

A first limitation member 14 made of rubber is located between the two side parts 13, and a second limitation member 15 made of rubber is located at an outside of each of the two side parts 13. Thus, the first end of each of the two pedal assemblies 20 is located between the second limitation member 15 and the first limitation member 14. The angle of swinging of the two pedal assemblies 20 can be limited by the first limitation member 14 and the second limitation member 15 as shown in FIG. 4. There will be no noise generated when the two pedal assemblies 20 are in contact with the first limitation member 14 and/or the second limitation member 15.

Two L-shaped connection members 23 are connected to the two respective second ends of the two pedal assemblies 20. Each L-shaped connector member 23 has two lugs 31. Each of the rear wheel assemblies 30 includes two upper stays 320 and two lower stays 32. A first end of the upper stays 320 is connected to a first end of the lower stays 32, and a shaft extends through the two respective first ends of the upper stays 320 and the lower stays 32 and the rear wheel 33. A tube 321 is connected to a second end of the two upper stays 320 and pivotably connected between the two lugs 31. A second end 322 of the two lower stays 32 is connected to one end of a spring 34, and the other end of the spring 34 is connected to the pedal assembly 20.

A braking assembly 40 includes a braking lever 42 connected to the handlebar. A cable has one end thereof connected to the braking lever 42, and the other end of the cable is connected to a braking spring 41 connected to one of the pedal assemblies 20. A braking pad 43 is pivotably connected to the rear wheel assembly 30. One end of the braking pad 43 is connected to the braking spring 41, and the other end of the braking pad 43 can be pivoted to contact and stop the rear wheel 33 when the braking lever 42 is pulled.

Figure 5:
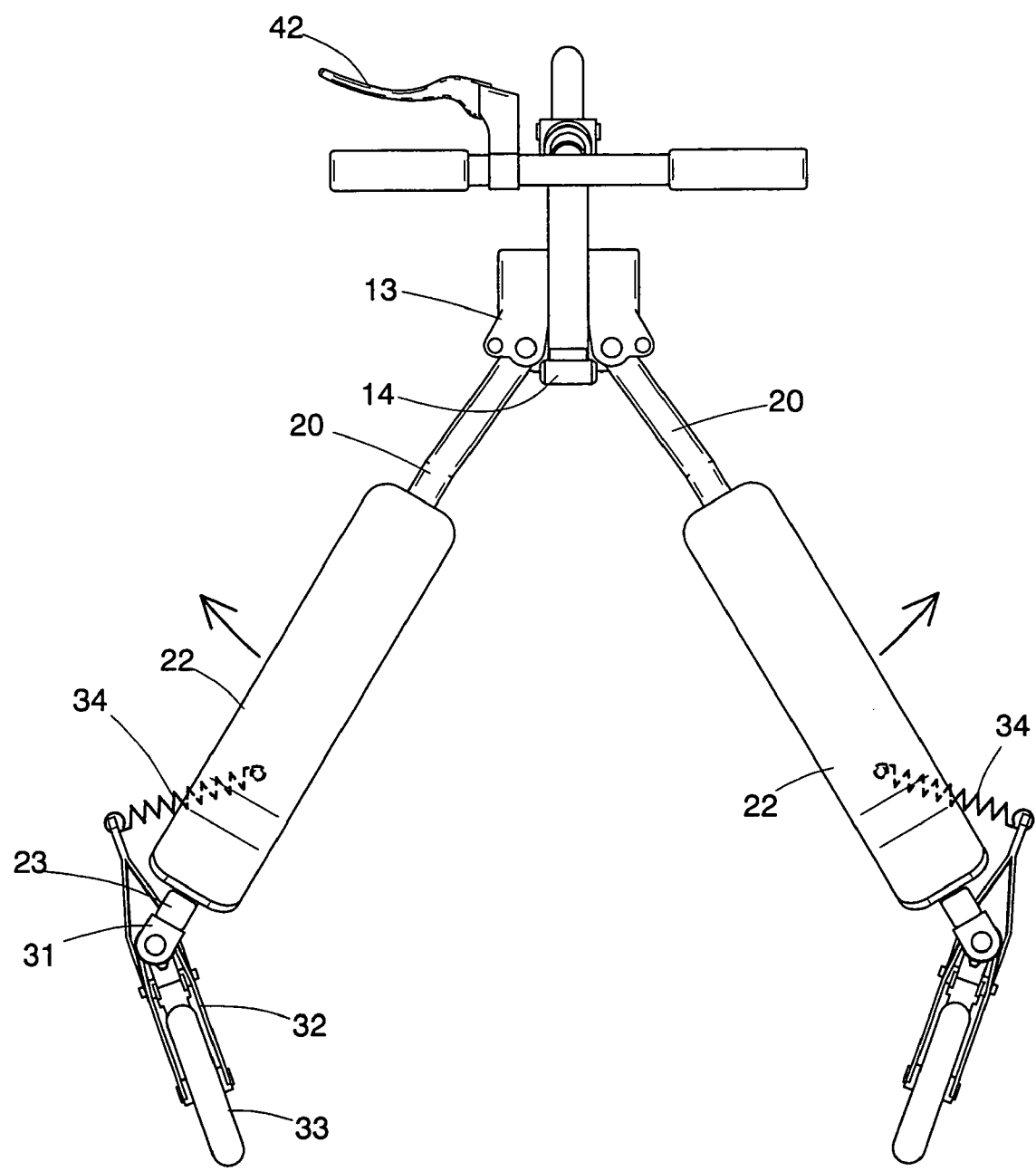
FIG. 5 shows the two rear wheel assemblies turning when the two pedal assemblies are pivoted outward.
Figure 6:
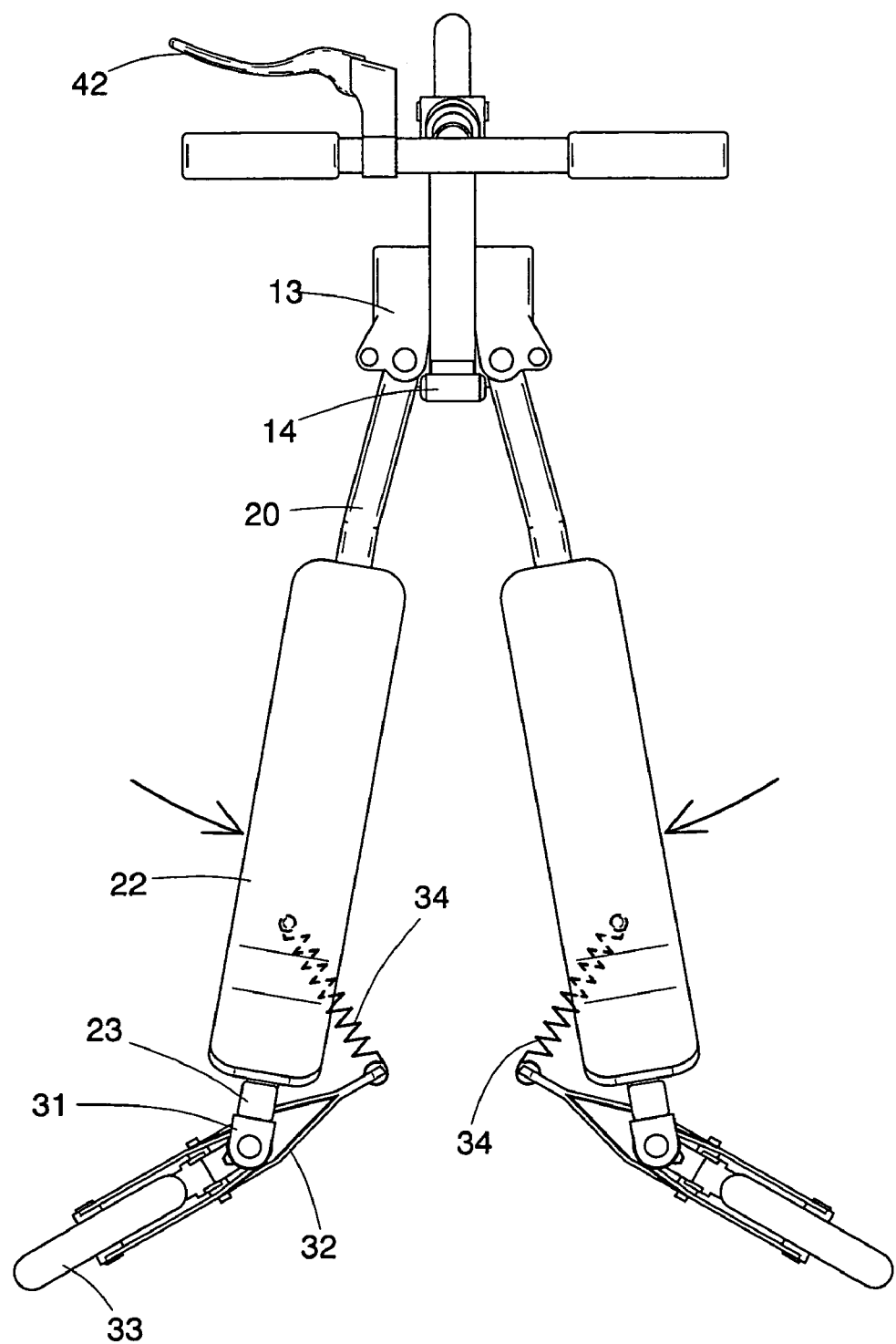
FIG. 6 shows the two rear wheel assemblies turning when the two pedal assemblies are pivoted inward.

Referring to FIGS. 5 and 6, a user (not shown) stands on the two pedals 22 with two feet and holds the handlebar. The two pedals 22 are simultaneously pushed outward as shown in FIG. 5, the rear wheel assemblies 30 turn outward and the second end of the lower stays 32 is pulled by the spring 34. Then, the two pedals 22 are pulled inward as shown in FIG. 6, the rear wheel assemblies 30 turn inward and the second end of the lower stays 32 is pulled by the spring 34. The scooter moves forward by the swinging of the two pedals 22 and by the rotation of the rear wheels 33. The turning of the rear wheels 33 is helpful to the movement of the scooter.

It is noted that the two pedals 22 have to be pivoted outward or inward simultaneously when operating the scooter, so that the two feet of the user are fully exercised.

While we have shown and described the embodiment in accordance with the present invention, it should be clear to those skilled in the art that further embodiments may be made without departing from the scope of the present invention.

What is claimed is:

1. A scooter comprising:
   a head tube and a steering rod extending through the head tube, a handlebar connected to a top of the steering rod and a front wheel pivotably connected to a lower end of the steering rod, an extension extending from the head tube;
   two pedal assemblies, each of the two pedal assemblies having a pedal connected thereto and having a first end thereof pivotably connected to the extension; and
   two rear wheel assemblies each including a rear wheel, with each of the two rear wheel assemblies pivotably connected to a second end of one of the two pedal assemblies, with each of the two rear wheel assemblies including a spring connected with the one of the two pedal assemblies.

2. The scooter as claimed in claim 1, wherein the extension includes two side parts and each side part has an opening in which one of the two pedal assemblies is pivotably connected.

3. The scooter as claimed in claim 2, wherein a first limitation member is located between the two side parts.

4. The scooter as claimed in claim 2, wherein a second limitation member is located at an outside of each of the two side parts and the first end of each of the two pedal assemblies is located between the second limitation member and the first limitation member.

5. The scooter as claimed in claim 1, wherein two connection members are connected to the two respective second ends of the two pedal assemblies and two lugs are connected to each of the connection members, each of the rear wheel assemblies including two upper stays and two lower stays, a first end of the upper stays connected to a first end of the lower stays, a shaft extending through the two respective first ends of the upper stays and the lower stays and the rear wheel, a tube connected to a second end of the two upper stays of each of the two rear wheel assemblies and pivotably connected between the two lugs, a second end of the two lower stays of each of the two rear wheel assemblies being connected to one end of the spring which is connected to the pedal assembly.

6. The scooter as claimed in claim 1 further comprising a braking assembly which includes a braking lever connected to the handlebar and a cable having one end thereof connected to the braking lever, the other end of the cable connected to a braking spring connected to one of the pedal assemblies, a braking pad pivotably connected to the rear wheel assembly and being pivoted to contact the rear wheel.

* * * * *